United States Patent [19]
Kneller et al.

[11] 3,780,994
[45] Dec. 25, 1973

[54] METHOD OF AND MEANS FOR ADJUSTING THE FLOW OF PLASTIC MATERIAL IN AN EXTRUDER CYLINDER

[75] Inventors: Klaus Kneller, Nurensdorf, Switzerland; Gerard Schaeffer, Ambilly, France

[73] Assignee: Schweizerische Industrie-Gelellschaft, Neuhausen am Rheinfall, Switzerland

[22] Filed: Dec. 3, 1971

[21] Appl. No.: 204,488

[30] Foreign Application Priority Data
Dec. 22, 1970  Switzerland.................... 19028/70

[52] U.S. Cl.................................. 259/191, 100/148
[51] Int. Cl............................ B29b 1/10, B30b 15/00
[58] Field of Search............................. 100/148, 150; 259/DIG. 6, DIG. 13, 2, 9, 10, 17, 25, 26, 27, 35, 45, 46, 47, 93, 191, 192, 193; 425/207, 208, 209

[56] References Cited
UNITED STATES PATENTS
3,276,353  10/1966  Burner et al.................. 100/148 X
3,111,080  11/1963  French et al................... 100/150 X FOREIGN PATENTS OR APPLICATIONS
427,571  4/1935  Great Britain..................... 100/148
326,741  3/1930  Great Britain..................... 100/148

Primary Examiner—Harvey C. Hornsby
Assistant Examiner—Alan I. Cantor
Attorney—Karl F. Ross

[57] ABSTRACT

To facilitate the linear adjustment of the flow rate of plastic material delivered by an extruder, of the type wherein a feed screw coaxially turns in a cylinder, an annular flow space is formed between the cylinder and an unthreaded downstream extension of the feed screw, this flow space including a constricted annular passage of variable length defined between two relatively axially shiftable collars on the cylinder and on the screw extension. In a specific embodiment, the cylinder is divided into an upstream section, a downstream section and an axially shiftable middle section, the latter carrying the outer one of the two collars and being held against rotation while a nut threadedly engaging that middle section is manually rotatable to displace it between a position of mutual alignment and a position of complete relative offset of these collars.

10 Claims, 7 Drawing Figures

PATENTED DEC 25 1973 3,780,994

METHOD OF AND MEANS FOR ADJUSTING THE FLOW OF PLASTIC MATERIAL IN AN EXTRUDER CYLINDER

FIELD OF THE INVENTION

This invention relates to a process for adjusting the flow of plastic material fed within an extruder cylinder by an extruder screw, over a predetermined length of the extruder screw, and to an extruder provided with means for carrying out this process.

BACKGROUND OF THE INVENTION

Various processes and devices for adjusting the flow of plastic material in an extruder are already known. In the case of extruders provided with a degassing channel, for example, it has been proposed to connect two portions of the extruder cylinder, located upstream and downstream, respectively, of the degassing channel, by a by-pass which can be opened or closed depending upon whether the flow of plastic material fed by the portion of the extruder screw upstream of the degassing channel is to be increased or reduced. However, with this system only a small portion of the extruder outflow can be adjusted. Moreover, this system can never be used to obtain an adjustment at the extruder head.

In another conventional extruder the adjusting device is formed by an annular ridge on the inner surface of the extruder cylinder and by a likewise annular groove provided in the extruder screw adjacent the ridge on the cylinder. The axial length of the ridge is smaller than the axial length of the groove and its radial height is chosen in such a manner that, when the ridge and the groove symmetrically confront each other, the periphery of the ridge and the bottom of the groove define therebetween an annular channel which permits the plastic material fed by the extruder screw to pass therethrough with a minimum loss of pressure. In this form of construction the extruder screw is movable in its axial direction by appropriate means to permit the size, particularly the width, of the inlet cross section of the annular channel to be varied and thus to vary the flow rate of plastic material entering the annular channel.

However, because of the relatively heavy weight of the extruder screw and the forces opposing its axial movement, particularly the forces exerted by the plastic material in the extruder cylinder, a relatively powerful motor is required to move the extruder screw.

Moreover, this manner of adjustment of the flow rate by restricting the cross section of the flow path of the plastic material cannot be used for certain types of plastic material, firstly because even a very small axial movement of the extruder screw will produce a very large variation of flow pressure in the plastic material passing the cross-sectional constriction and thereby an excessive change in the flow rate, and secondly because the shearing stress and deformation produced in the plastic material is very high when a great flow-pressure loss is to be produced.

Thus, this system is too sensitive to permit an appropriate adjustment and may cause damage to the plastic material by excessive shearing stress.

It has already been proposed to eliminate the first one of the aforesaid disadvantages by providing an extruder in which the adjusting members are formed by an annular ridge on the extruder screw and an annular groove provided in the extruder cylinder adjacent this ridge so that the ridge and the groove together define an annular channel whose inlet or outlet cross section can be varied by axially shifting within the groove a sleeve mounted on the extruder cylinder. Reference in this connection is made to commonly owned U.S. Pat. No. 3,704,972.

However, the changes in flow rate produced by shifting the sleeve are still too great for certain types of plastic materials so that the device described above still has the same inconvenience of being difficult to adjust.

OBJECT OF THE INVENTION

It is the object of the present invention to eliminate the above-mentioned disadvantages.

SUMMARY OF THE INVENTION

This object is realized, in accordance with our present invention, by providing both the cylinder and an unthreaded portion of the feed screw, extending downstream from a threaded portion thereof, with respective collars having confronting cylindrical surfaces of substantially the same axial dimension, one of these collars being axially shiftable with reference to the other so as to vary the effective length of a constricted passage formed between them in an annular flow space defined by the cylinder and the downstream feed-screw extension. The range of axial displacement of the shiftable collar extends between a position of mutual alignment, in which the length of the narrow clearance between the collars has its maximum value, and a position of complete relative offset in which that length is zero.

In an advantageous embodiment, the shiftable collar is the one mounted on the cylinder which for this purpose is axially divided into an upstream section enveloping the threaded portion of the feed screw, a downstream section axially spaced from this upstream section, and a shiftable middle section bearing the movable collar, this middle section bridging the two other sections in all positions of adjustment.

BRIEF DESCRIPTION OF THE DRAWING

The invention will now be described by way of example and with reference to the accompanying drawing, in which.

Figure 1:
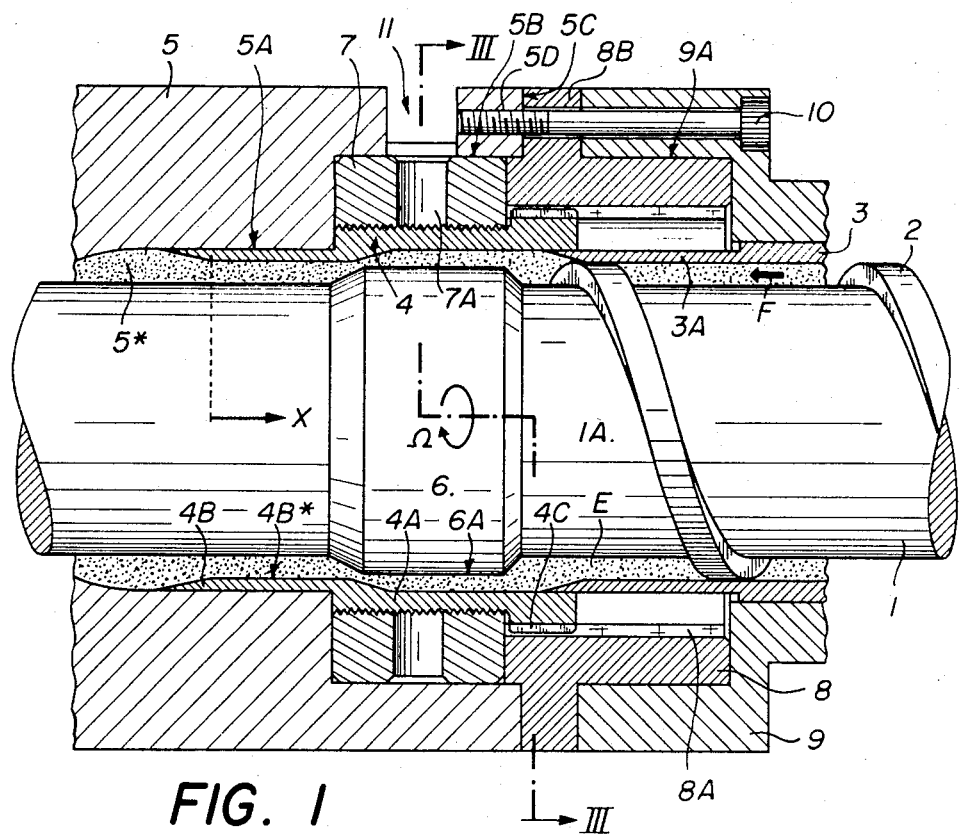
FIG. 1 is a fragmentary longitudinal section through a first embodiment of an extruder according to the invention.

In the drawing only a small portion of the length of an extruder is shown, namely the portion which relates to the features of the present invention, this portion being provided with means for varying the extruder output without varying the speed of rotation of the extruder screw.

FIG. 1 shows part of a screw 1 with a portion of a screw thread 2, the screw 1 being arranged to be driven in rotation by a motor, not shown, at an angular speed $\Omega$. The screw 1 is mounted in a conventional manner in the interior of a cylinder of which three sections 3, 4 and 5 are shown in FIG. 1. The cylinder sections or members 3, 4 and 5 together with the screw 1 define an annular working E in the right-hand portion of FIG. 1, this space E being filled with pasty plastic material fed by the screw 1 with a helical movement in an axial direction F.

Figure 2:
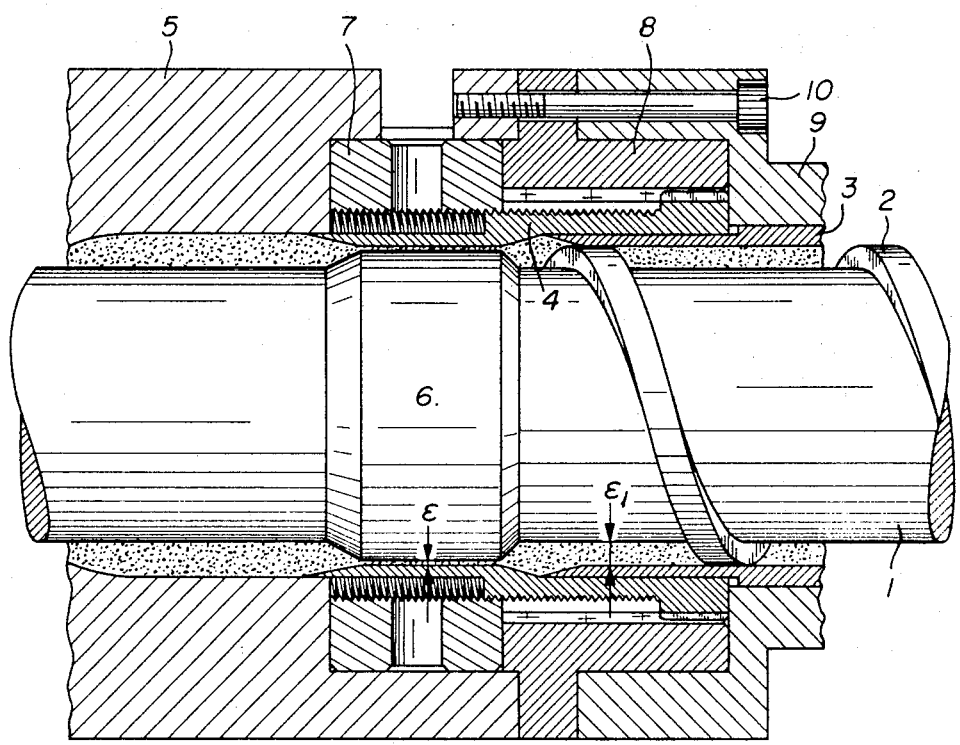
FIG. 2 is a section similar to that of FIG. 1, but showing some of the extruder parts in a different position.

In the embodiment of the extruder illustrated in FIGS. 1 and 2, the screw thread 2 is interrupted in the vicinity of the region 1A of the screw 1 to form an unthreaded screw extension, downstream of its threaded portion, with an annular collar 6 whose outer surface 6A constitutes a cylindrical ridge of a radius corresponding substantially to the radius of curvature of the thread 2 about the screw axis. The diameter of the screw extension extending to the left of the collar 6 is substantially the same as the diameter of the core of the screw portion on the right of the collar 6.

The cylinder members 3, 4 and 5 are an upstream section 3, a downstream section 5 axially spaced from section 3, and a middle section 4 adapted to be shifted to a first limiting position located on the extreme left, as seen in FIG. 1, to second limiting position located on the extreme right and illustrated in FIG. 2, and to any intermediate position. The purpose of this shifting will be explained hereinafter.

As shown in FIG. 1, the cylinder member 4 has a first tubular segment 4A, slidably mounted with its inner surface on the outer surface of a projecting tubular skirt portion 3A of the cylinder member 3, and a second tubular segment or collar 4B slidably mounted with its outer face on the cylindrical inner surface 5A of cylinder member 5.

It is to be noted that the cylindrical inner surface 4B* of the collar 4B of the cylinder member 4 has an axial length corresponding to that of the outer surface 6A of the collar 6 and that its radius of curvature is slightly larger than the radius of curvature of surface 6A so that when, for example, the collar 4B is aligned with collar 6, as shown in FIG. 2, it defines therewith an annular clearance having a radial width $\epsilon$ which is relatively small as compared, for example, with the radial width $\epsilon_1$ of the annular passage between the core of screw 1 and the cylinder member 3.

Figure 3:
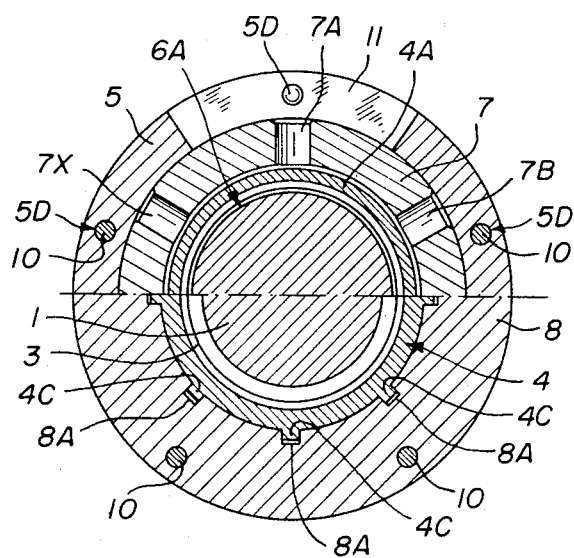
FIG. 3 is a transverse section taken along the line III—III of FIG. 1.

The tubular segment 4A has a threaded outer surface screwed into the threaded bore of a nut 7 accommodated in a cylindrical recess 5B provided in the cylinder member 5. Adjacent this screw thread the tubular segment 4A is provided at the end remote from the collar 4B with a series of longitudinally extending peripherally equispaced projecting ribs 4C, as shown in FIG. 3, the ribs 4C being slidably received in grooves 8A in a sleeve 8 which, with its left end as seen in FIG. 1, engages in the recess 5B of cylinder member 5 and adjoining the nut 7 on the upstream side With its right end the sleeve 8 engages in a cylindrical recess 9A formed in a tubular member 9 fitted on the cylinder member 3. On its outer surface the sleeve 8 is provided with a flange 8B bearing against the straight end face of the cylinder member 5. A plurality of peripherally equispaced holes 5D extend through the flange 5B and serve to receive screw bolts 10 for securing the sleeve 8 and the member 9 to the cylinder member 5.

As best seen in FIGS. 1 and 3, the peripheral surface of the nut 7 is provided with a plurality of peripherally equispaced cylindrical holes 7A, 7B up to 7X extending with their longitudinal axes radially to the longitudinal axis of the screw 1. Further, the cylinder member 5 is provided with an arcuate groove 11 whose longitudinal plane of symmetry extends perpendicularly to the axis of screw 1 and coincides with the plane containing the longitudinal axes of the holes 7A-7X. The width of the groove 11 is slightly larger than the diameter of the holes 7A-7X and its angular extent is slightly larger than the distance between any pair of holes 7A-7X as measured between the most distant points of the peripheral walls of such pair of holes.

By virtue of this particular dimensioning of the groove 11 and holes 7A-7X, the groove 11 will always leave free at least one of these holes and at the most two of them. In the latter case one of the holes, e.g., the hole 7A, will be located in the immediate vicinity of the left end of the groove 11 (as viewed in FIG. 3) while the second hole, e.g., the hole 7B, will occupy a position directly adjacent the right end of the groove 11.

The groove 11 and the holes 7A-7X provided in the cylinder member 5 and the nut 7, respectively, are intended to permit angular movement of the nut 7 in both directions. Such angular movement or rotation of the nut 7 produces an axial shifting of the cylinder member 4. The length of such axial shift is limited, on the one hand, by abutment of an annular shoulder of the tubular segment 4A of the cylinder member 4 against the end face of the recess 5B in the cylinder member 5, as seen in FIG. 1, and, on the other hand, by abutment of the free (right-hand) end of that segment 4A against the end face of the recess 9A in the member 9, as seen in FIG. 2

When the cylinder member 4 is in its axial position in which it abuts against the member 9, as shown in FIG. 2, the cylindrical surface 4B* of the collar 4B registers exactly with the surface 6A of the collar 6 of the screw 1 and defines with the latter an annular passage of width $\epsilon$ extending over the full axial length of these collars.

On the other hand, when the cylinder member 4 abuts against the cylinder member 5, as shown in FIG. 1, the collar 4B occupies a position completely offset from collar 6 and the length of the constricted passage of width $\epsilon$ has been reduced to zero.

For rotating the nut 7 a tool such as a bar is passed through the groove 11 into one of the radial holes of the nut, visible in the groove 11; a torque is then exerted on the bar in one or the other direction depending upon whether the cylinder member 4 is to be rotated from left to right, or from right to left, as seen in FIG. 1. When upon angular movement of the nut 7, the actuating bar abuts against one end of the groove 11, which may be the left or the right end depending upon the direction of rotation, the bar is withdrawn from the holes hole into which it was inserted, and introduced into the hole appearing at the other end of the groove 11, whereupon a torque is again exerted on the bar to move the cylinder member 4 in the desired direction. The same procedure is adopted when, upon opposite rotation of the nut 7, the actuating bar abuts on the forward end of the groove 11.

Thus, the described mechanism permits to impart manually a stepwise movement to the cylinder member 4. In practice the width and direction of this movement are chosen in relation to the rate of pressure loss which is to be produced within the cylinder of the extruder to control the output of plastic material fed by the extruder screw, as will be described hereinafter.

Figure 4:
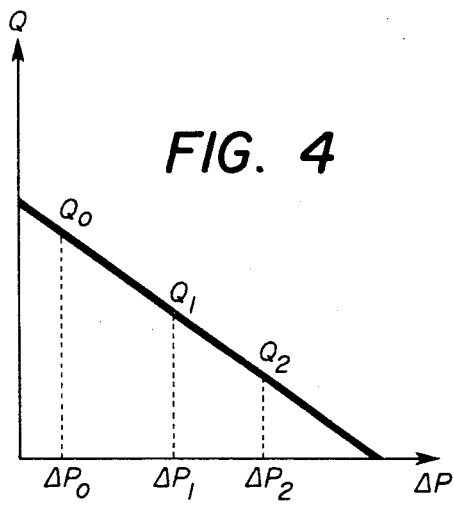
FIGS. 4 and 5 are illustrative diagrams.

In this connection, it is to be noted that, in an extruder whose screw moves at a constant speed, the flow rate Q of the plastic mass forced through the extruder cylinder along any given segment of the extruder screw is a direct function of the pressure difference $\Delta P$ existing between the ends of this screw segment, and that this output follows a law which may be represented by a straight line (see particularly FIG. 4).

In our improved extruder this feature is utilized to obtain an adjustment of the output of extruded material by varying the pressure difference $\Delta P$.

For this purpose, and as described previously, the cylinder member 4 can be moved between two extreme positions, i.e.:

a. A first position in which the shiftable cylinder member 4 is on the extreme left, as shown in FIG. 1, and the length of the constricted passage of width between the collars 6 and 4B is zero In this position (X=0) the pressure differential developed in the material flowing in the direction F is at a minimum value corresponding to $\Delta P_o$ in the diagram of FIG. 5 so that the flow rate is at a maximum value corresponding to $Q_o$ in the diagram of FIG. 4.

b. A second position in which the cylinder member 4 is on the extreme right side, as shown in FIG. 2, and the length of the annular passage of width $\epsilon$ between the collars 6 and 4B is greatest. This second position is spaced from the first position by a length $x_2$ indicated in FIG. 5.

Figure 5:
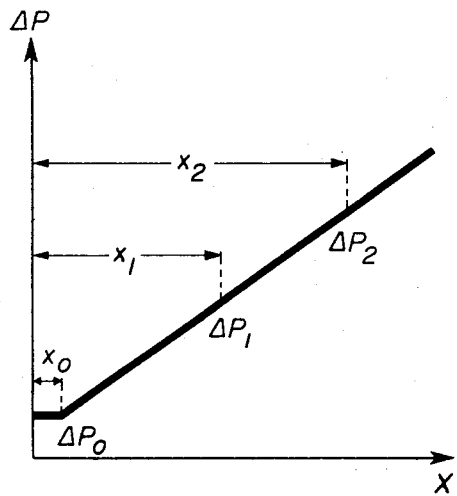

The flow of plastic material fed by the extruder screw in the direction F through this annular passage produces a relatively great pressure loss indicated by $\Delta P_2$ in FIG. 5 so that the flow rate through this passage is at a minimum value $Q_2$ indicated in FIG. 4.

Obviously the cylinder member 4 may also be adjusted to any intermediate axial position between the above-described first and second extreme positions. For example, the cylinder member 4 may be moved from its extreme left position to an intermediate position spaced from the extreme left position by a length $x_o$. In this intermediate position the right end of the cylindrical surface 4B* of the collar 4B* is exactly aligned with the left end of the cylindrical surface 6A of the collar 6. In this new position the pressure loss is in practice slightly different from the aforementioned value $\Delta P_o$, but for reasons of clarity of the diagram of FIG. 5, and in view of the scale to which it is drawn, this difference has been neglected. This position represents the start of the range of linear adjustment of the flow rate.

When now the cylinder member 4 is moved further away from its extreme left position, for example, by a distance $x_1$, the lengthening of the constricted passage of width $\epsilon$, defined between the confronting portions of the collar surfaces 6A and 4B*, causes a pressure loss of a value $\Delta P_1$ located between the limiting values $\Delta P_o$ and $\Delta P_2$, this value $\Delta P_1$ being substantially linearly related to the difference between the distances $x_1$ and $x_o$. In effect, as is known from the laws of fluid mechanics, the pressure loss in a fluid flowing through a constriction of given length and constant cross section is substantially proportional to this length provided that the flow is laminar and homogeneous while the fluid may be Newtonian or non-Newtonian. Obviously a flow rate $Q_1$ between the values $Q_o$ and $Q_2$, as shown in FIG. 4, corresponds to this pressure differential $\Delta P_1$.

Thus, the adjustment of the extruder output described above can be very easily carried out either manually or automatically as it is effected in a continuous and practically constant manner over the entire length of possible axial movement of the cylinder member 4.

Also, the shearing stress to which the plastic material fed by the extruder screw is subjected, in the interior of the adjusting constriction, will remain substantially constant irrespective of the axial length of this constriction; this shearing stress can be reduced as a function of the clearance $\epsilon$ to a sufficiently low level to avoid excessive heating and consequent deterioration of the plastic material.

Evidently the invention is not limited to the embodiment described above and illustrated in the drawings. In particular, although we have only disclosed an extruder in which the output is adjusted by axial movement of a cylinder member defining an annular constriction with a collar provided on the extruder screw, obviously also a construction can be devised in which the adjustable constriction is bounded, on the one hand, by an axially fixed annular collar projecting from the inner surface of the extruder cylinder and, on the other hand, by an annular member mounted for axial movement on the extruder screw, or by a collar formed integrally with the screw if the latter is mounted for axial movement.

It should further be noted that the illustrated assembly of adjustment means, provided on the extruder to permit the flow of plastic material to be varied in the region of the extruder screw downstream of this assembly, may be located in any other region along the extruder cylinder. For example, in the case of an extruder provided with a gas-discharge channel, this assembly may be located upstream of the gas-discharge channel.

It is also possible to provide a second similar assembly immediately upstream of the discharge end of the extruder, particularly if the extruder output is to be completely controlled by such adjustment means.

Finally, the means for controlling the axial movement of the cylinder member delimiting the annular constriction may be of a construction different from that shown in FIGS. 1 to 3 of the drawing.

Figure 6:
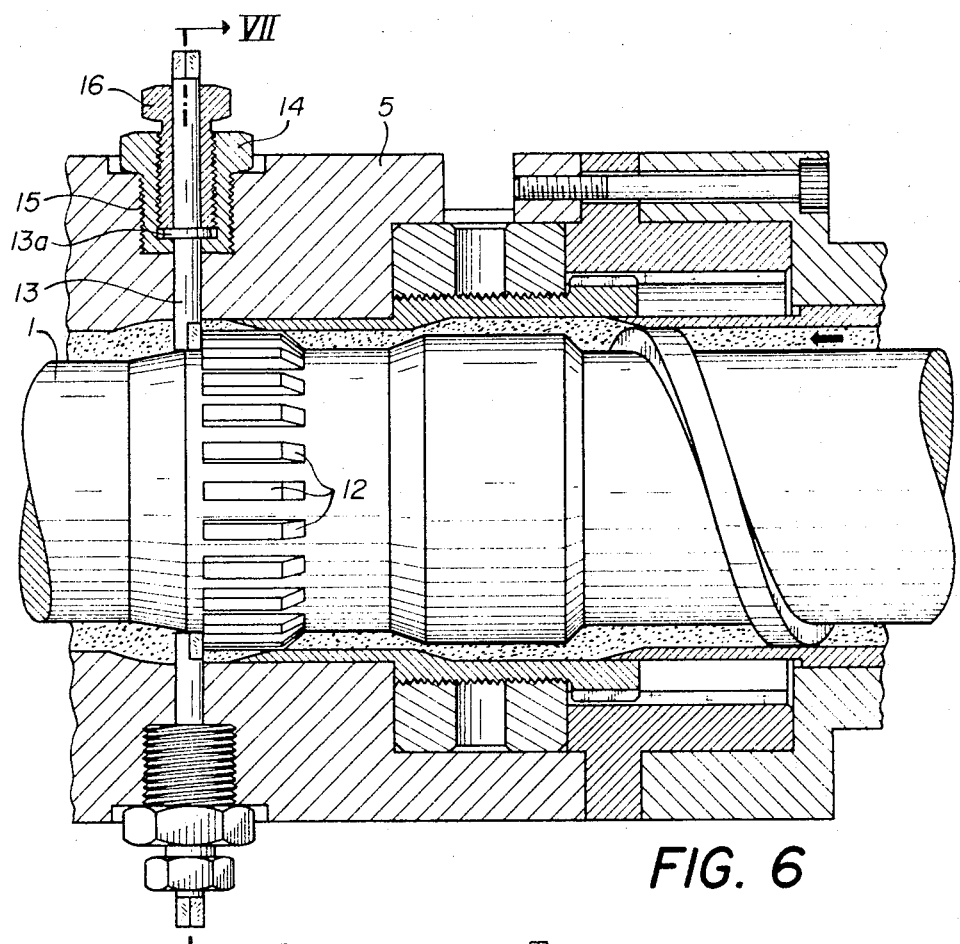
FIG. 6 is a fragmentary longitudinal section of another embodiment of the extruder according to the invention.
Figure 7:
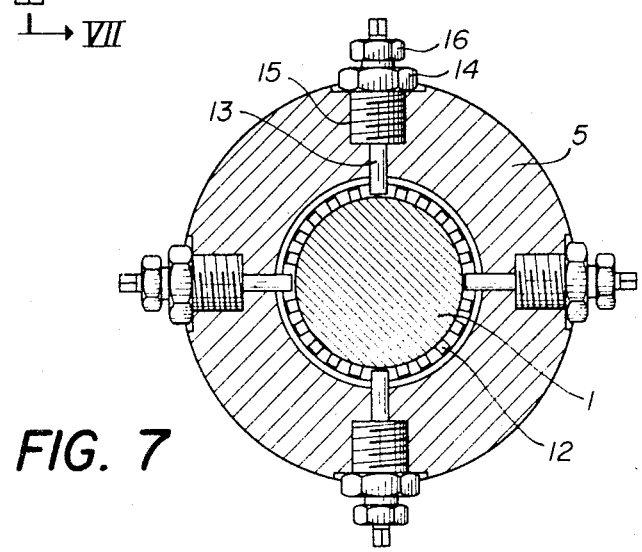
FIG. 7 is a transverse section taken along the line VII—VII of FIG. 6.

FIGS. 6 and 7 show a modification of the extruder which, to facilitate the operation of degassing the molten plastic material downstream of the boss 6, is provided with means for splitting up and fractionizing the flowable mass entering the cylinder member 5.

This means for splitting up the flowable mass comprises, on the one hand, a plurality of elongate ribs 12 arranged downstream of the collar 6 on the extruder screw and, on the other hand, a set of four radial rods 13 mounted on the cylinder member 5 and projecting with their inner ends into the space between the cylinder member 5 and the extruder screw downstream of the ribs 12.

The ribs 12 could also be oriented in a manner different from that shown in FIG. 6. For example, the ribs 12 could extend in a helical line in the same or the opposite direction with reference to the extruder screw threads.

Furthermore, to another modification, not the ribs 12 may have different heights, e.g. a height which increases steadily from one of the ribs around the circumference of the extruder screw, it being understood that their greatest height will always be smaller than the space between the extruder cylinder and the extruder screw.

As shown in FIG. 6, each rod 13 has a collar 13a supporting the rod 13 on the bottom of a thimble 14 threaded externally and internally and screwed into a correspondingly threaded recess 15 provided in the cylinder member 5. An externally threaded sleeve 16 is screwed into the inner threads of thimble 14. The sleeve 16 is slipped over the stem of the rod 13 and bears against the collar 13a thereon to retain the rod 13 within the thimble 14.

With this arrangement of the rods 13 they can be easily replaced by other, longer or shorter, rods to permit the use of rods 13 which project with a major or minor portion of their length into the space between the cylinder member 5 and the threadless portion of extruder screw 1.

The projecting end of each rod 13 may be more or less sharp to facilitate the splitting up of the flow coming from the gaps between the ribs 12. In fact, the ribs 12, on the one hand, and the projecting ends of the rods 13, on the other hand, exert the following action on the molten plastic material coming from the portion of the extruder screw upstream of collar 6: When the molten plastic material arrives in the vicinity of the ribs 12 it is split up into a great number of individual veins passing between each pair of neighboring ribs 12. In this manner some of the gaseous fluid which may be contained in the mass is released and, as the mass leaves the ribs 12, each vein thereof is split up by the rods 13 and this permits most of the gas remaining in each vein to escape and flow toward the degassing channel, for example, through the empty space left by the mass between the extruder screw threads.

It is in fact known that the plastic material fed by the screw in an extruder generally takes up only a portion of the space between the extruder screw threads and that the plastic material is moved in a helical line between the screw threads in engagement with the front faces of the screw threads.

It is further to be noted that, in addition to this degassing action, the ribs 12 and rods 13 perform an intense mixing of the plastic material to thereby improve its homogeneity.

A similar result can be obtained by using projecting elements arranged differently from the described ribs 12. Alternatively the projecting elements may be formed by small lugs or any desired form and dimensions, arranged in a predetermined geometrical order or at random.

We claim:

1. A method of linearly adjusting the flow rate of plastic material delivered by an extruder including a feed screw coaxially rotating within a cylinder, comprising the steps of:

providing a variable constriction in an annular flow path present between the cylinder and an unthreaded downstream extension of the feed screw, the constriction being defined by a cylindrical outer surface of a first annular element on said extension and a cylindrical inner surface on a second annular element on said cylinder, said cylindrical surfaces having substantially the same axial dimension and being separated by a narrow annular clearance in a position of mutual alignment; and relatively axially shifting said annular elements in a range substantially equal to said axial dimension, bounded by said position of mutual alignment and by a position of complete relative offset of said cylindrical surfaces, with development of a pressure differential in said flow path varying substantially linearly with the effective axial length of said clearance.

2. In an extruder comprising a cylinder and a rotatable feed screw coaxially disposed in said cylinder, said feed screw having threads for advancing a plastic mass under pressure in a predetermined axial flow direction, the improvement wherein said feed screw is provided downstream of said threads with an unthreaded extension forming with said cylinder an annular flow space with a first collar having a cylindrical outer surface, said cylinder being provided in the region of said flow space with a second collar having a cylindrical inner surface whose axial dimension substantially equals that of said outer surface, the radius of curvature of said inner surface exceeding that of said outer surface by substantially less than the width of said flow space whereby a constricted passage for said plastic mass is formed between said surfaces upon axial alignment of said collars, one of said collars being axially shiftable with reference to the other collar between a position of mutual aligngent and a position of complete relative offset of said surfaces whereby the effective axial length of said constricted passage is variable between zero and a maximum value with development of a pressure differential in said flow path varying as a linear function of said axial length.

3. The improvement defined in claim 2 wherein the axially shiftable collar is said second collar.

4. The improvement defined in claim 3 wherein said cylinder is axially divided into an upstream section enveloping said threads, a downstream section axially spaced from said upstream section, said upstream and downstream sections lying on opposite sides of said first collar, and a middle section carrying said second collar, said middle section being axially shiftable and bridging said upstream and downstream sections in all positions of adjustment thereof.

5. The improvement defined in claim 4 wherein said cylinder further includes a tubular member rigid with one of the axially spaced sections thereof and defining therewith a recess confronting said middle section, the latter having a pair of abutments within said recess engageable with respective end faces of said recess for limiting the shifting of said middle section to a distance substantially equaling the axial dimension of said collars.

6. The improvement defined in claim 5 wherein said middle section has a threaded outer surface confronting said recess, further comprising a nut rotatably lodged in said recess in engagement with said threaded surface and guide means for holding said middle section against rotation.

7. The improvement defined in claim 6 wherein said guide means comprises a sleeve fixedly mounted in said recess alongside said middle section, said nut and said sleeve being provided with axially extending formations matingly engaging each other.

8. The improvegent defined in claims 7 wherein said cylinder has an arcuate slot communicating with said recess, said nut being provided with peripherally spaced holes accessible through said slot for enabling manual rotation thereof.

9. The improvement defined in claim 5 wherein said tubular member is rigid with said downstream section and extends around said middle section with said recess terminating in the region of said threads, said upstream section having a tubular skirt which projects into said recess toward said first collar and slidably supports a segment of said middle section adjoining said second collar.

10. The improvement defined in claim 2 wherein said downstream section is provided with a radially extending rods bearing upon said extension beyond the range of axial shift of said middle section, said extension being provided with a multiplicity of peripherally spaced ribs adjoining said pins on the upstream side for fractionating the flow of plastic mass issuing from said constricted passage.

* * * * *